United States Patent
von Flotow et al.

(10) Patent No.: US 7,602,415 B2
(45) Date of Patent: Oct. 13, 2009

(54) COMPENSATION FOR OVERFLIGHT VELOCITY WHEN STABILIZING AN AIRBORNE CAMERA

(75) Inventors: Andreas H. von Flotow, Hood River, OR (US); Mathieu Mercadal, Hood River, OR (US)

(73) Assignee: Insitu, Inc., Bingen, WA (US)

( * ) Notice: Subject to any disclaimer, the term of this patent is extended or adjusted under 35 U.S.C. 154(b) by 0 days.

(21) Appl. No.: 10/758,684

(22) Filed: Jan. 15, 2004

(65) Prior Publication Data

US 2004/0207727 A1    Oct. 21, 2004

Related U.S. Application Data

(60) Provisional application No. 60/440,983, filed on Jan. 17, 2003.

(51) Int. Cl.
H04N 7/00 (2006.01)
H04N 7/18 (2006.01)

(52) U.S. Cl. .................. 348/144; 348/113; 348/116; 348/117; 348/118; 348/143

(58) Field of Classification Search ............... 348/144, 348/169; 356/139.04, 139.05, 139.06; 244/3.16
See application file for complete search history.

(56) References Cited

U.S. PATENT DOCUMENTS

| 3,085,354 A | 4/1963 | Rasmussen et al. |
|---|---|---|
| 3,567,163 A | 3/1971 | Kepp et al. |
| 3,638,502 A | 2/1972 | Leavitt et al. |
| 4,643,539 A | 2/1987 | Brignall |
| 4,728,839 A | 3/1988 | Coughlan et al. |
| 4,736,218 A | 4/1988 | Kutman |
| 4,989,466 A | 2/1991 | Goodman |
| 5,088,818 A | 2/1992 | Nicholson |
| 5,116,118 A * | 5/1992 | Jones ........................... 356/2 |
| 5,184,521 A | 2/1993 | Tyler |
| 5,259,037 A | 11/1993 | Plunk |

(Continued)

FOREIGN PATENT DOCUMENTS

GB    1116801    6/1968

(Continued)

OTHER PUBLICATIONS

EO Target Geolocation Determination; Y. A. Wu; IEEE; Dec. 1995.*

(Continued)

*Primary Examiner*—Christopher Kelley
*Assistant Examiner*—Justin E Shepard
(74) *Attorney, Agent, or Firm*—Perkins Coie LLP

(57) ABSTRACT

A method and system for maintaining the line of sight of an airborne camera fixed on a target by compensating for overflight velocity of the aircraft. The compensation system automatically commands an angular velocity of the line of sight to maintain the camera pointing at the target being overflown. This angular velocity of the line of sight is computed based upon the aircraft overflight velocity and upon a vector from the aircraft to the target. This automatic compensation for aircraft overflight velocity causes the line of sight to remain fixed upon the target. The compensation system drives a gimbal system upon which the camera is mounted to perform this compensation automatically.

28 Claims, 7 Drawing Sheets

U.S. PATENT DOCUMENTS

| | | | |
|---|---|---|---|
| 5,347,910 A * | 9/1994 | Avila et al. | 89/41.22 |
| 5,383,645 A | 1/1995 | Pedut et al. | |
| 5,589,901 A | 12/1996 | Means | |
| 5,687,249 A * | 11/1997 | Kato | 382/104 |
| 5,897,223 A | 4/1999 | Tritchew | |
| 5,954,310 A | 9/1999 | Soldo et al. | |
| 5,967,458 A * | 10/1999 | Williams et al. | 244/3.16 |
| 6,072,571 A | 6/2000 | Houlberg | |
| 6,100,925 A * | 8/2000 | Rosser et al. | 348/169 |
| 6,292,215 B1 | 9/2001 | Vincent | |
| 6,323,898 B1 * | 11/2001 | Koyanagi et al. | 348/169 |
| 6,377,906 B1 * | 4/2002 | Rowe | 702/151 |
| 6,424,804 B1 | 7/2002 | Johnson et al. | |
| 6,672,535 B2 * | 1/2004 | Brunner et al. | 244/3.16 |
| 6,798,984 B2 * | 9/2004 | Antikidis | 396/13 |
| 6,820,531 B1 | 11/2004 | Cianciolo | |
| 6,849,980 B1 | 2/2005 | Voigt et al. | |
| 6,995,788 B2 * | 2/2006 | James | 348/169 |
| 7,133,067 B1 | 11/2006 | Claus et al. | |
| 2002/0130953 A1 * | 9/2002 | Riconda et al. | 348/115 |
| 2003/0155463 A1 | 8/2003 | Cox et al. | |
| 2004/0207727 A1 | 10/2004 | von Flotow et al. | |

FOREIGN PATENT DOCUMENTS

| | | |
|---|---|---|
| WO | WO-01/95614 | 12/2001 |
| WO | WO-2004/067432 A2 | 8/2004 |
| WO | WO-2004/068403 A2 | 8/2004 |
| WO | WO-2004/102473 A2 | 11/2004 |

OTHER PUBLICATIONS

U.S. Appl. No. 10/742,578, Mathieu Mercadel.
U.S. Appl. No. 10/726,334, Andreas H. von Flotow.
Nettmann Systems International, Gyron DSG (Dual Sensor Gyro Stabilized Gimbal Postioning Video Cameral), Internet, pp. 1-4.
European Search Report, European Patent Application No. 047607776.7; Applicant: Insitu, Inc.; Mailed on Feb. 17, 2009, 3 pages.

* cited by examiner

COMPENSATION FOR OVERFLIGHT VELOCITY WHEN STABILIZING AN AIRBORNE CAMERA

CROSS-REFERENCE TO RELATED APPLICATION

The present application claims the benefit of pending U.S. Provisional Application No. 60/440,983, filed Jan. 17, 2003 which is incorporated herein in its entirety by reference.

TECHNICAL FIELD

The described technology relates to an apparatus for stabilization of the pointing direction of an airborne camera.

BACKGROUND

The pointing direction or line of sight of an airborne camera that is fixed to the body of an aircraft moves about as the aircraft maneuvers. For example, as the aircraft rolls, the camera rolls up or down depending on which side of the aircraft it is mounted. If the camera is inertially stabilized, rather than fixed to the body of the aircraft, its line of sight will remain in a fixed direction relative to the body of the aircraft as the aircraft maneuvers. When the camera is inertially stabilized, its field of view sweeps across a scene at a velocity equal to the overflight velocity of the aircraft. For example, if the camera is pointing directly down with its scan aligned with the body of the aircraft and the aircraft is traveling at 360 mph and if the camera's field of view is one mile, then an object entering the field of view will exit the field of view in 10 seconds.

Inertial stabilization is typically effected by mounting an airborne camera within a gimbal system, and driving the gimbals based on the roll, pitch, and heading of the aircraft. Such an approach can deliver high-quality stabilized pointing, but aircraft overflight velocity is not removed. Operator inputs are used to command changes in line of sight to compensate for overflight velocity. Such systems are the subject of U.S. Pat. No. 5,897,223; U.S. Pat. No. 3,638,502; U.S. Pat. No. 4,989,466; U.S. Pat. No. 4,643,539; and U.S. Pat. No. 5,184,521. FIG. 1 illustrates a prior technique that does not correct for overflight velocity of the aircraft over the target. In such prior art, the line of sight of the camera is inertially stabilized. In this example, as the aircraft 100 circles 101, the camera's line of sight sweeps out a circle 102. This stabilization sweeps the imaged area across the ground at a velocity equal to aircraft overflight velocity. To compensate for the overflight velocity, an operator would manually need to keep the camera pointing at the target.

Automatic compensation for aircraft overflight velocity causes the line of sight to remain fixed upon a selected position relative to the ground. If the gimbal system performs this compensation automatically, then the operator is relieved of this burden.

DETAILED DESCRIPTION

A method and system for maintaining the line of sight of an airborne camera fixed on a target by compensating for overflight velocity of the aircraft is provided. The compensation system automatically commands an angular velocity of the line of sight to maintain the camera pointing at the target (e.g., a selected location on the ground) being overflown. This angular velocity of the line of sight is computed based upon the aircraft overflight velocity and upon a vector from the aircraft to the target. This automatic compensation for aircraft overflight velocity causes the line of sight to remain fixed upon the target. The compensation system drives a gimbal system upon which the camera is mounted to perform this compensation automatically. As a result, the camera can remain pointed at the target without needing operator intervention.

In one embodiment, the compensation system calculates the radians per second in the scan and tilt directions that the camera needs to move to compensate for the overflight velocity of the aircraft. The compensation system periodically (e.g., 20 times per second) calculates the radians and adjusts the gyro's angular control of the gimbal system. The compensation system calculates both a static and a dynamic adjustment. The static adjustment represents the difference in radians between the actual line of sight of the camera and the needed line of sight of the camera based on the current positions of the aircraft and the target. The dynamic adjustment represents the radians per second that the camera needs to move to compensate for the overflight velocity. The compensation system combines the static and dynamic adjustments to give the actual adjustment. The dynamic adjustments allow for smooth and continuous adjustments to be made based on velocity, whereas the static adjustments tend to correct for accumulated errors in the line of sight. The compensation system may apply a weighting factor to the static and dynamic adjustments. For example, if the position of the aircraft is not very accurate, then the static adjustment may be given a low weight relative to the dynamic adjustment because the dynamic adjustment would be assumed to be more accurate. By combining the static and dynamic adjustments, the compensation system can more accurately keep the line of sight of the camera on the target.

Figure 1:
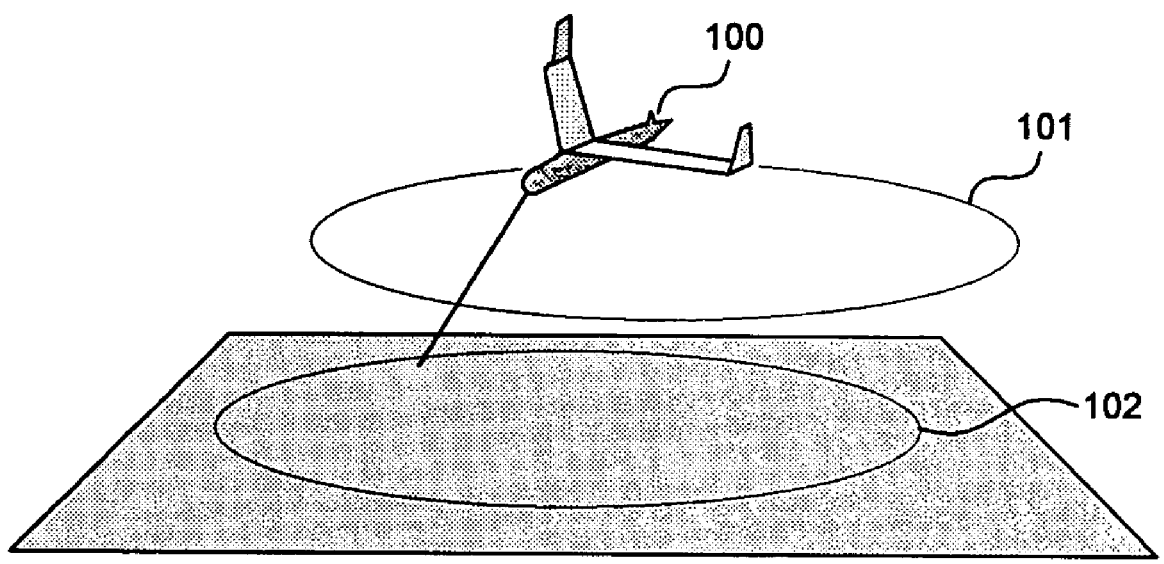
FIG. 1 illustrates a prior technique requiring operator correction for overflight velocity of the aircraft over the target.
Figure 2:
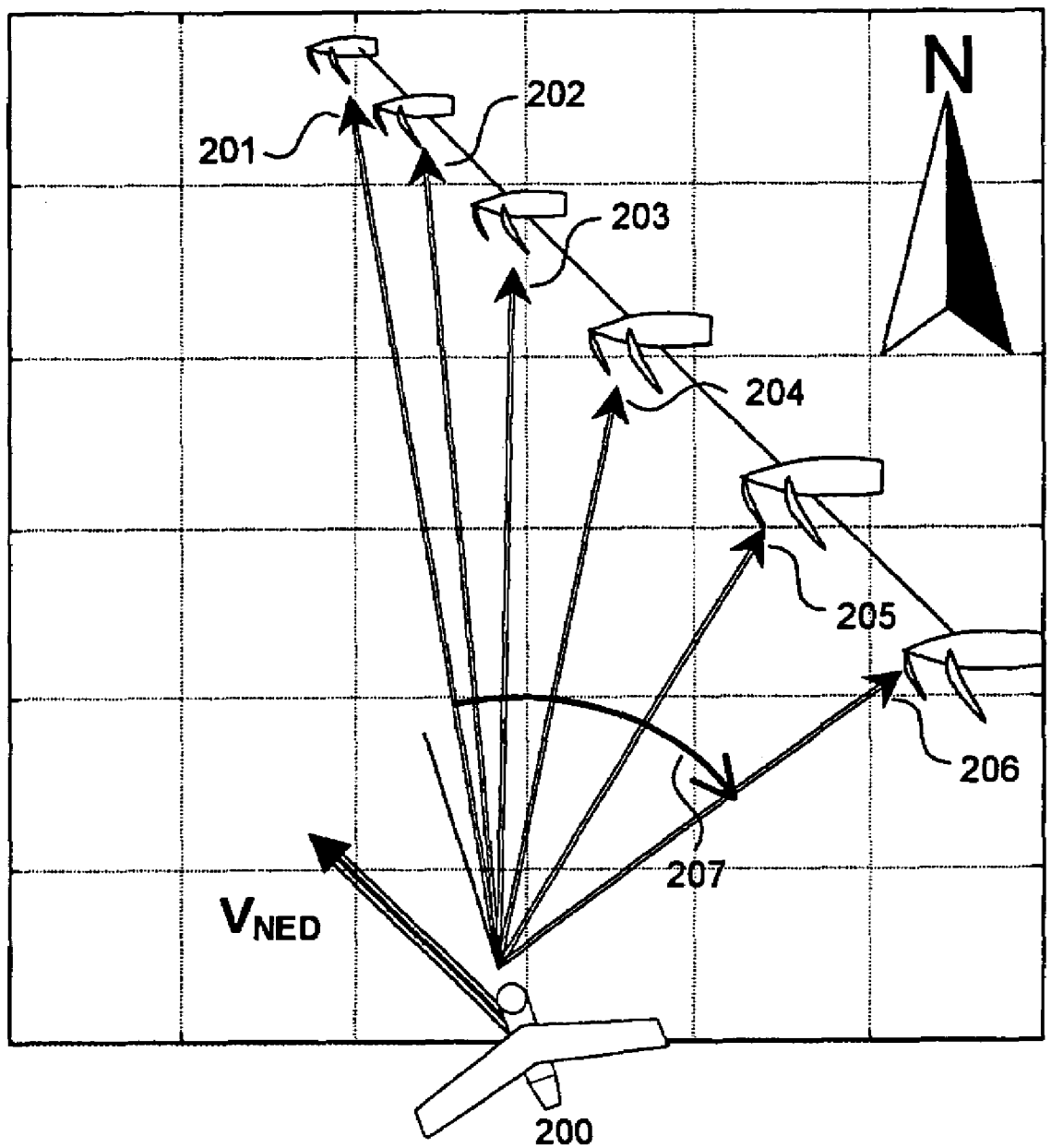
FIG. 2 illustrates the compensation system in which the line of sight of the camera is not inertially stabilized but is rather given an angular velocity.

FIG. 2 illustrates the line of sight of a camera that is given an angular velocity by the compensation system. This angular velocity compensates for the overflight velocity of the aircraft with respect to the target. The center of the imaged area is held fixed upon a location on the ground. The aircraft 200 is traveling at a velocity represented by vector $V_{NED}$. Initially, the line of sight of the camera is in the direction represented by vector 201. As the aircraft flies at velocity $V_{NED}$, the angular velocity of the camera is represented by vector 207. The line of sight of the camera transitions through vector 201 to vector 206 in order to keep the line of sight on the target.

Figure 3:
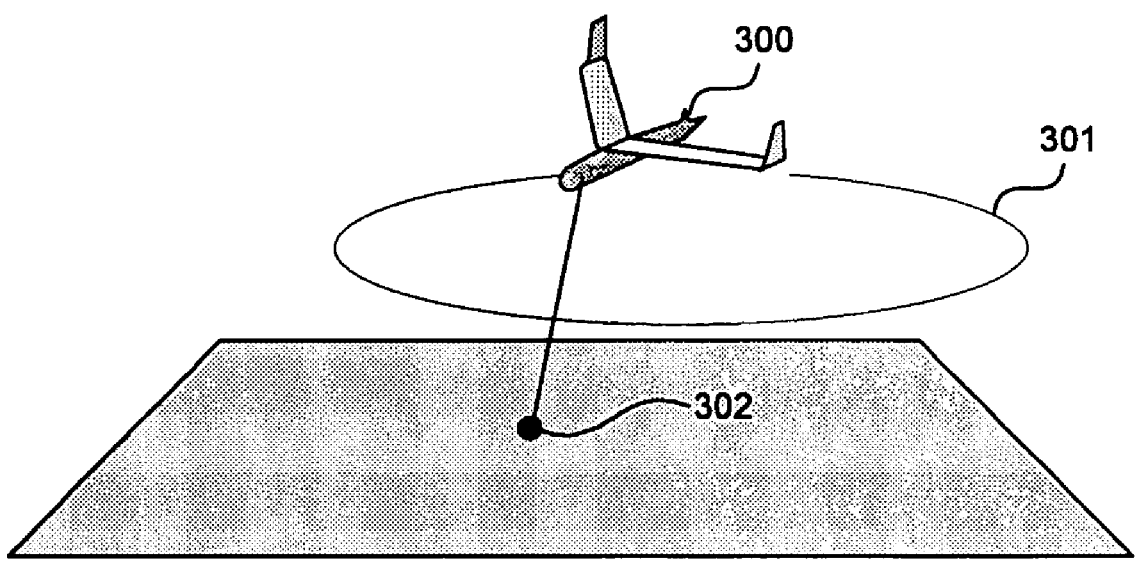
FIG. 3 illustrates the effect of this compensation upon the image sequence created by the camera.

FIG. 3 illustrates the effect of the compensation upon the image sequence created by a camera. This compensation causes the field of view to remain fixed upon a selected location, rather than sweep along at aircraft overflight velocity. In this example, as the aircraft 300 circles 301, the camera's line of sight stays centered on target 302.

Figure 4:
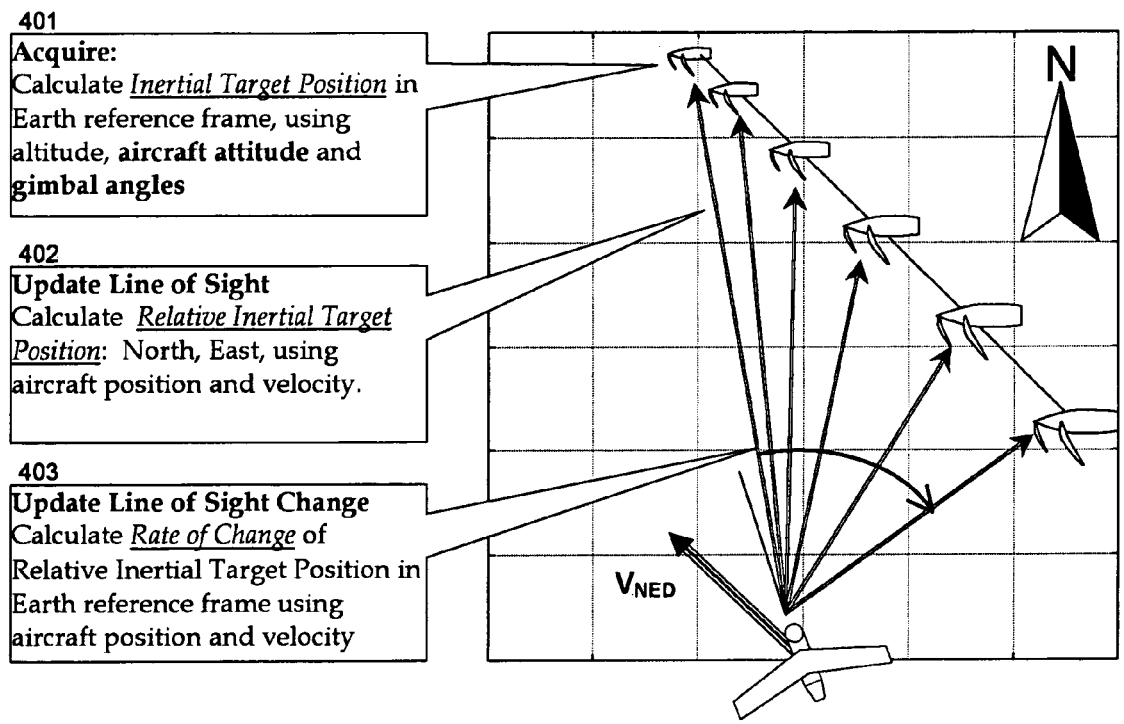
FIG. 4 illustrates how the required angular velocity of the line of sight is calculated.

FIG. 4 illustrates calculation of the angular velocity of the camera to keep the line of sight centered on the target. The calculation employs the relative velocity between the aircraft and the target, together with the vector from the aircraft to the target. This calculation is performed continuously, as the aircraft velocity and position change and as the target location changes. The compensation system initially acquires 401 the target position by, for example, an operator centering the camera on the target. The compensation system can calculate the position of the target based on the altitude of the target (e.g., sea level), aircraft altitude and position, and angles of the gimbal system. The compensation system then updates 402 the line of sight based on the current aircraft position and the target position. The compensation system calculates 403 the rate of change of the line of sight based on the current aircraft position and the target position along with relative velocity between aircraft and target. The update of the line of sight is the static adjustment, and the update of the rate of change is the dynamic adjustment. The compensation system loops calculating the static and dynamic adjustments. The dynamic adjustment allows for the adjusting of the line of sight continuously, that is the gimbals are moved at the specified angular rate between calculations. The static adjustment allows for the line of sight to be corrected due to accumulated errors caused by the dynamic adjustment and prior static adjustments. If the dynamic adjustment were not made, the error between the static adjustments would be much larger.

Figure 5:
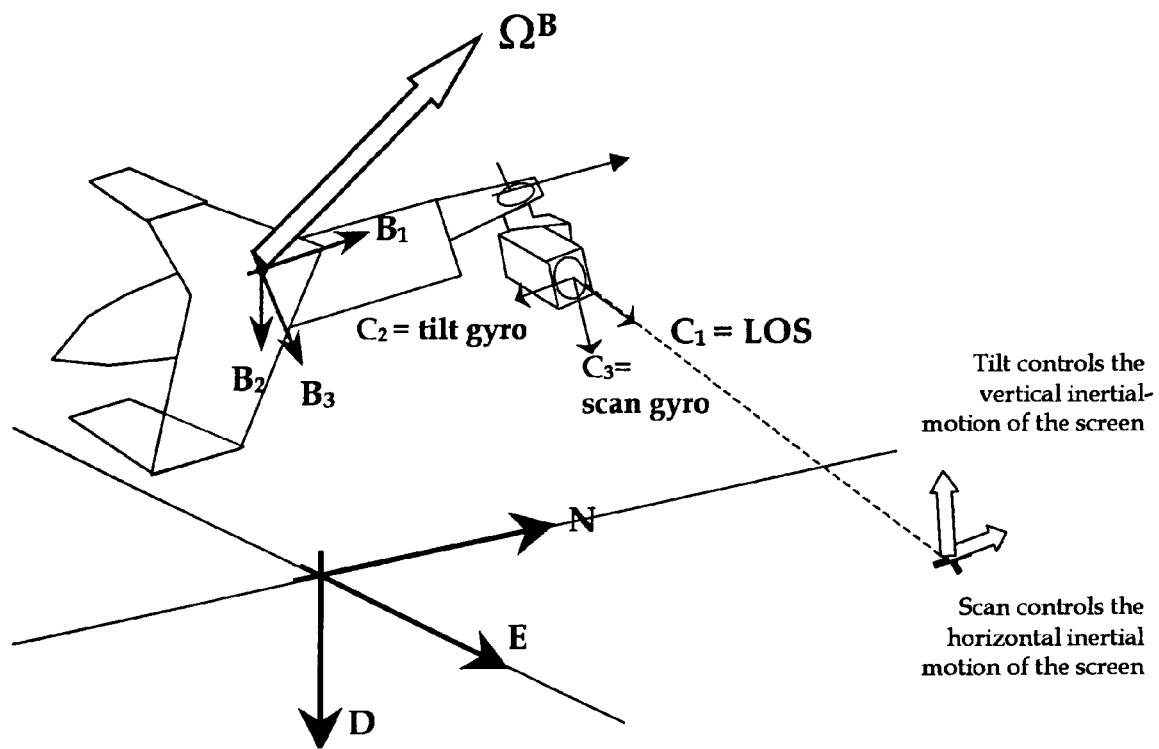
FIG. 5 is a diagram illustrating the reference frames used in the compensation system.

FIG. 5 is a diagram illustrating the reference frames used in the compensation system in one embodiment. The reference frame of the earth is represented by north N, east E, and down D coordinates. The position of an aircraft, which may be provided by an altimeter and a GPS system, is in the earth reference frame. The reference frame of the body of the aircraft $\Omega^B$ is represented by heading B1, pitch B2, and roll B3 coordinates that may be provided by the aircraft's gyros. The reference frame of the camera is represented by a line of sight C1, tilt C2, and scan C3 coordinates. In one embodiment, the camera is controlled by an inertial stabilization system that controls the gimbal motors to control the orientation of the C1, C2, and C3 camera axes. The compensation system receives camera scan and tilt rate information from the camera rate gyros and adjusts these rates to further account for the overflight velocity. The inertial stabilization system maintains the orientation of the camera to compensate for the maneuvering of the aircraft.

The compensation system inputs the altitude of the target and an indication of the line of sight of the camera when pointing at the target. The compensation system initially calculates the position of the target in the reference frame of the earth $R_{target}^E$ using the position of the aircraft $R_{aircraft}^E$. The compensation system then repeatedly adjusts the gimbal angles so that the target is in the line of sight of the camera to compensate for the overflight velocity. The compensation system calculates the velocity of the aircraft relative to the target and adjusts the gimbal angles as the aircraft moves so that the target will remain in the line of sight. This adjustment is referred to as the dynamic difference in the line of sight because it compensates for movement of the aircraft relative to the target. Because the adjustments may not perfectly compensate for the overflight velocity, the compensation system also calculates the static difference between the actual line of sight of the camera and the line of sight needed to point to the target. The compensation system includes this static difference in the adjustment to the gimbal angles. Thus, the adjustments for dynamic differences based on velocity compensates for the overflight velocity, and the adjustments for static differences based on the line of sight of the camera compensates for variations between the intended and the actual line of sight.

The compensation system uses transformation matrices to represent the current orientation of the body of the aircraft relative to the earth reference frame and the current orientation of the camera to the body reference frame. The camera reference frame relative to the body of the aircraft reference frame is represented by a transformation matrix $C_{CB}$ for transforming a vector from the body reference frame to the camera reference frame. $C_{CB}$ is a 3-by-3 matrix whose columns are orthogonal and normalized, also referred to as a matrix of direction cosines. The following equation represents the conversion of a position in the body reference frame to the camera reference frame:

$$R^C = C_{CB} R^B \tag{1}$$

where $R^B$ represents the position in the body reference frame and $R^C$ represents the position in the camera reference frame. An example $C_{CB}$ is $$\begin{matrix} 2^{-1/2} & -2^{-1/2} & 0 \\ 2^{-1/2} & 2^{-1/2} & 0 \\ 0 & 0 & 1 \end{matrix} \tag{2}$$

The matrix $C_{CB}$ is set based on the angles of the gimbal relative to the body. Thus, this matrix represents the current gimbal angles. A matrix $C_{BE}$ is for transforming from the earth reference frame to the body reference frame. Thus, the matrix $C_{BE}$ represents the heading, pitch, and roll of the aircraft as measured by the gyro of the aircraft.

Figure 6:
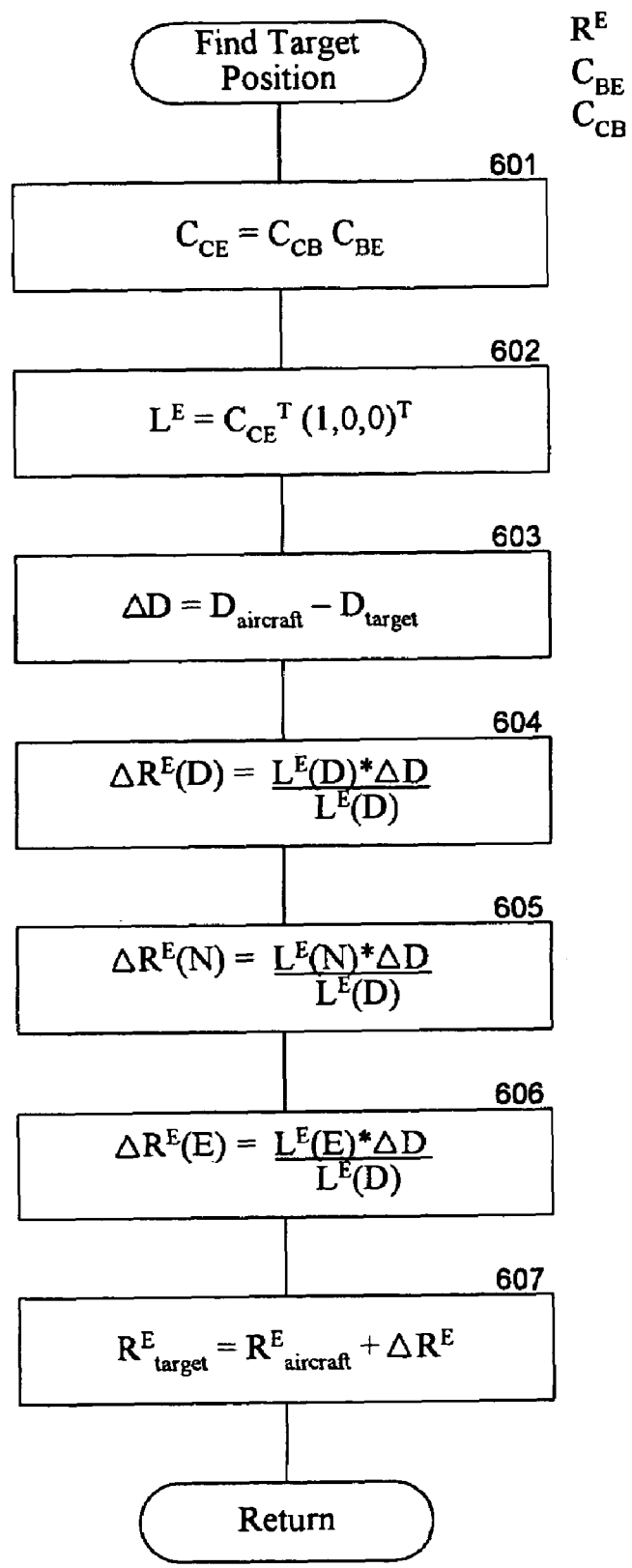
FIG. 6 is a flow diagram illustrating the processing of a component that establishes the position of the target in one embodiment.

FIG. 6 is a flow diagram illustrating the processing of a component of the compensation system that establishes the position of the target in one embodiment. The component inputs the position of the aircraft $R_{aircraft}^E$ an indication of the pitch, roll, and heading of the aircraft; an indication of the direction of the target in the camera reference frame; and the altitude of the target. The indication of the pitch, roll, and heading of the aircraft is represented by a transformation matrix $C_{BE}$ for transforming a position in the earth reference frame to the body reference frame. The indication of the line of sight of the camera (which is pointing at the target) is represented by a transformation matrix $C_{CB}$ for transforming a position in the body reference frame to the camera reference frame. The direction of the target may be indicated by centering the camera on the target. Alternatively, an operator could point to the target as it is being displayed using a pointing device such as a mouse. The line of sight of the camera is given by vector (1,0,0) in the camera reference frame. Thus, if the target is centered in the camera image, then its coordinates are (1,0,0). Otherwise, its coordinates have non-zero scan and tilt values. In block 601, the component calculates a transformation matrix for transforming from the earth reference frame to the camera reference frame as follows:

$$C_{CE} = C_{CB} C_{BE} \tag{3}$$

In block 602, the component calculates the line of sight of the camera in the earth reference frame as $$L^E = C_{CE}^T (1,0,0)^T \tag{4}$$

where $L^E$ is the line of sight of the camera in the earth reference frame and where the superscript T represents the transform of the matrix or vector. In block 603, the component calculates the altitude difference between the aircraft and the target. The altitude difference between the aircraft and the target is $$\Delta D = D_{aircraft} - D_{target} \quad (5)$$

where D represents the down coordinate of the earth reference frame. In blocks 604-606, the component adjusts $L^E$ by $\Delta D$ to convert it to the actual position vector $\Delta R^E$ from the aircraft to the target. The adjustment multiplies each coordinate by $\Delta D$ divided by the down coordinate of the line of sight of the camera in the earth reference frame represented as $L^E(D)$ as follows:

$$\Delta R^E(D) = L^E(D) * \frac{\Delta D}{L^E(D)} \quad (6)$$

$$\Delta R^E(N) = L^E(N) * \frac{\Delta D}{L^E(D)}$$

$$\Delta R^E(E) = L^E(E) * \frac{\Delta D}{L^E(D)}$$

where $\Delta R^E(x)$ represents the difference in position vector between the aircraft and the target in the earth reference frame, $L^E(x)$ represents the line of sight of the camera in the earth reference frame, x represents a component of the reference frame, and $\Delta D$ represents the difference in altitude between the aircraft and the target. In an alternate embodiment, the actual position vector from the aircraft to the target $\Delta R^E$ can be calculated by multiplying the line of sight of the camera $L^E$ times the range K as follows:

$$\Delta R^E = L^E * K \quad (7)$$

The range can be determined using a range finder instrument. In block 607, the component calculates the position of the target in the earth reference frame as $$R_{target}^E = \Delta R^E + R_{aircraft}^E \quad (8)$$

The component then returns the position of the target $R_{target}^E$.

Figure 7:
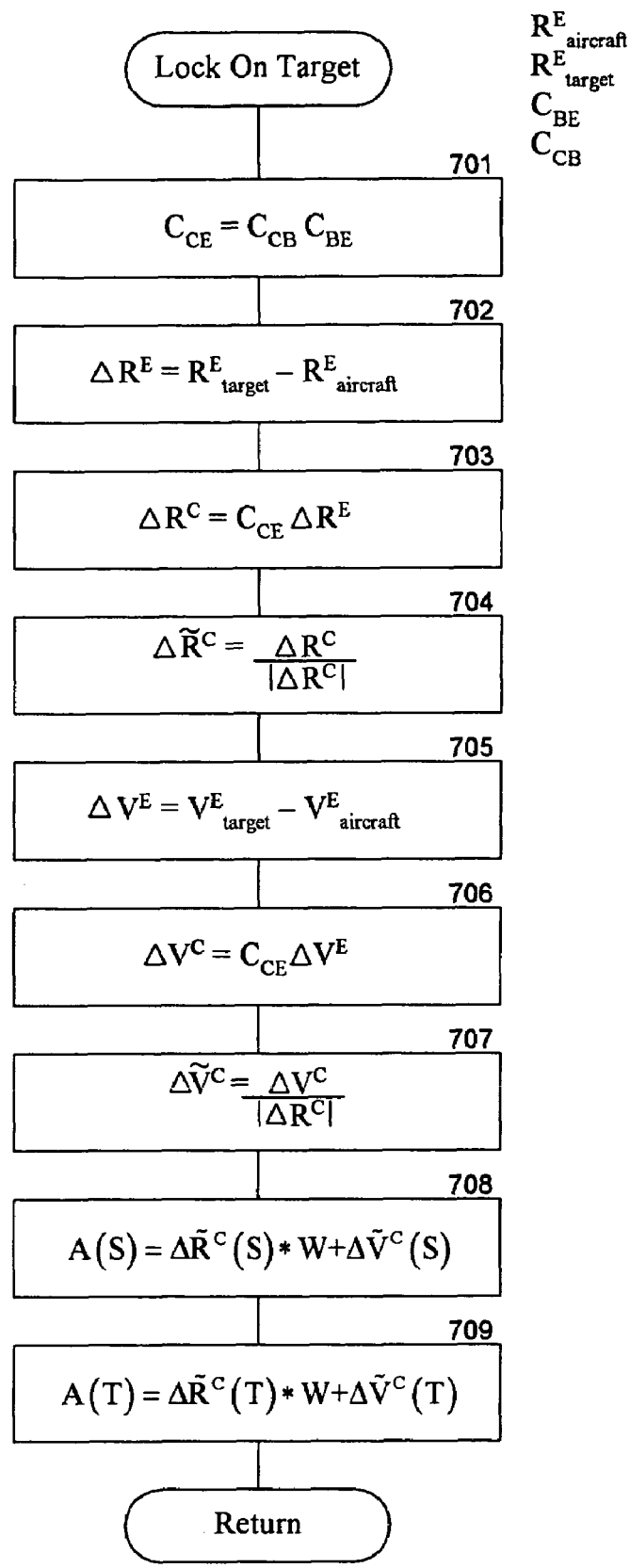
FIG. 7 is a flow diagram illustrating the processing of a component that locks on the target in one embodiment.

FIG. 7 is a flow diagram illustrating the processing of a component that locks on the target in one embodiment. The component may be invoked several times per second and is passed the current position of the aircraft and target ($R_{aircraft}^E$ and $R_{target}^E$); an indication of the pitch, roll, and heading of the aircraft ($C_{BE}$); and an indication of the line of sight of the camera ($C_{CB}$). In block 701, the component calculates a transformation matrix for transforming from the earth reference frame to the camera reference frame as follows:

$$C_{CE} = C_{CB} C_{BE} \quad (9)$$

In block 702, the component calculates the position vector ($\Delta R^E$) between the aircraft and the target in the earth reference frame as:

$$\Delta R^E = R_{target}^E - R_{aircraft}^E \quad (10)$$

In block 703, the component transforms $\Delta R^E$ to the camera reference frame as follows:

$$\Delta R^C = C_{CE} \Delta R^E \quad (11)$$

In block 704, the component normalizes the position vector between the aircraft and the target by dividing its coordinates by the distance from the aircraft to the target as follows:

$$\Delta \tilde{R}^C = \frac{\Delta R^C}{|\Delta R^C|} \quad (12)$$

where $\Delta \tilde{R}^C$ is the normalized position vector and $|\Delta R^C|$ is the distance from the aircraft to the target. The scan and tilt coordinates of the normalized position vector indicate the difference in radians between the actual line of sight of the camera and the line of sight needed to point to the target in the scan and tilt directions, which represents the static adjustment. In block 705, the component calculates the velocity vector ($\Delta V^E$) between the aircraft and the target in the earth reference frame as:

$$\Delta V^E = V_{target}^E - V_{aircraft}^E \quad (13)$$

In block 706, the component transforms the velocity vector $\Delta V^E$ to the camera reference frame as follows:

$$\Delta V^C = C_{CE} \Delta V^E \quad (14)$$

where $\Delta V^C$ represents the velocity vector in the camera reference frame. In block 707, the component normalizes the velocity vector between the aircraft and the target by dividing its coordinates by the distance from the aircraft to the target as $$\Delta \tilde{V}^C = \frac{\Delta V^C}{|\Delta R^C|} \quad (15)$$

where $\Delta \tilde{V}^C$ is the normalized velocity vector and $|\Delta R^C|$ is the distance. The scan and tilt coordinates indicate the radians per second that the camera needs to move to compensate for the overflight velocity in the scan and tilt directions. In block 708, the component calculates the adjustment for the signal from the inertial stabilizer to the gimbal for the scan of the camera as $$A(S) = \Delta \tilde{R}^C(S) * W + \Delta \tilde{V}^C(S) \quad (16)$$

where A(S) is the adjustment for the scan coordinate in radians per second, $\Delta \tilde{R}^C(S)$ is the scan coordinate of the normalized position vector, $\Delta \tilde{V}^C(S)$ is the scan coordinate of the normalized velocity vector, and W is a weighting factor for combining the velocity and position variation in units of per second. The weighting factor can be increased or decreased to compensate for the accuracy of the measurements used to calculate the dynamic and static adjustments. For example, if the attitude of the aircraft is known to be not very accurate, then the weighting factor may be small. Conceptually, $\Delta \tilde{R}^C(S)$ is the error between the line of sight of the camera and where it should be to point to the target, and $\Delta \tilde{V}^C(S)$ is the velocity at which the camera should be scanning to keep the target in its line of sight. The compensation system compares the adjustment to the scan rate of the camera provided by the gyro and uses the difference in rate to control the velocity of the gimbal motors. For example, if the gyro indicates that the camera should scan at 0.1 radian per minute and the compensation system indicates that the scan rate should be 0.01 radians per minute, then the rate provided to the gimbal system would be 0.11 radians per minute. In block 709, the component calculates the adjustment for the signal from the inertial stabilizer to the gimbal for the tilt of the camera in an analogous manner and then returns the adjustments.

In one embodiment, the compensation system calculates the altitude of the target based on a user indicating the position of a target on the camera image. For example, a user may center the target within the image at one time and then at a later time again center the target within the image. Thus, the compensation system has two lines of sight to the target from two different aircraft positions. The compensation system can convert these lines of sight to the earth reference frame and then calculate their point of intersection in the earth frame of reference, which gives the altitude of the target. The compensation system can also calculate the velocity of the target based on a series of centering the image on the target or a series of indications where the target is within the image (e.g., clicking on the target). This velocity and altitude can be provided to compensate for the overflight velocity.

One skilled in the art will appreciate that although specific embodiments of the compensation system have been described for purposes of illustration, various modifications can be made without deviating from the spirit and scope of the invention. For example, the principles of the compensation system may be used on a transport mechanism other than an airplane, such as a satellite, a rocket, a missile, a train, an automobile, and so on. In addition, the compensation system may be used to control the "line of sight" or "orientation" of a device other than a camera, such as a laser or a weapons system. In such a case, a positioning scope may be used to establish the initial line of sight to the target. Accordingly, the invention is described by the appended claims.

We claim:

1. A method for controlling the line of sight of a camera to remain fixed on a target, the camera being on an aircraft whose current position is moving at a velocity relative to a current position of the target, the method comprising:
   setting an initial line of sight for the camera that is aimed at the current position of the target;
   calculating a transformation matrix $C_{CE}$ for transforming from the earth reference frame to the camera reference frame;
   periodically determining a static adjustment including,
      calculating a position vector $\Delta R^E$ between the aircraft and the target in the earth reference frame as: $\Delta R^E = R_{target}^E - R_{aircraft}^E$, wherein $R_{target}^E$ represents the current position of the target and $R_{aircraft}^E$ represents the current position of the aircraft,
      calculating a position vector $\Delta R^C$ between the aircraft and the target in the camera reference frame by transforming the position vector $\Delta R^E$ to the camera reference frame as $\Delta R^C = C_{CE} \Delta R^E$,
      calculating a normalized position vector $\Delta \tilde{R}^C$ as $$\Delta \tilde{R}^C = \frac{\Delta R^C}{|\Delta R^C|},$$

wherein the normalized position vector indicates the difference between the actual line of sight of the camera and the line of sight needed to point to the target in the scan and tilt directions, and
      setting the line of sight of the camera based at least in part on the normalized position vector $\Delta \tilde{R}^C$;
   periodically determining a dynamic adjustment including,
      calculating a velocity vector $\Delta V^E$ between the aircraft and the target in the earth reference frame as: $\Delta V^E = V_{target}^E - V_{aircraft}^E$, wherein $V_{target}^E$ represents the current velocity of the target and $V_{aircraft}^E$ represents the current velocity of the aircraft,
      calculating a velocity vector $\Delta V^C$ between the aircraft and the target in the camera reference frame by transforming the velocity vector $\Delta V^E$ to the camera reference frame as $\Delta V^C = C_{CE} \Delta V^E$,
      calculating a normalized velocity vector $\Delta \tilde{V}^C$ as $$\Delta \tilde{V}^C = \frac{\Delta V^C}{|\Delta R^C|},$$

wherein the normalized velocity vector indicates the angular velocity that the camera needs to move in the scan and tilt directions to compensate for overflight velocity, and
      setting an angular velocity for moving the line of sight of the camera based at least in part on the normalized velocity vector $\Delta \tilde{V}^C$;
   maintaining the line of sight of the camera by combining the determined dynamic and static adjustments as the attitude of the aircraft changes relative to the current position of the target, including selling an adjustment A for the camera wherein $A = \Delta \tilde{R}^C * W + \Delta \tilde{V}^C$ and wherein W represents a weighting factor based at least in part on the accuracy of the measurements used to calculate the dynamic and static adjustments.

2. The method of claim 1 wherein the initial line of sight of the camera is set based on an operator centering the line of sight of the camera on the target.

3. The method of claim 1 wherein the initial line of sight of the camera is set based on the current position of the target and the current position and attitude of the vehicle.

4. The method of claim 1 wherein the vehicle is land based.

5. The method of claim 1 wherein the vehicle is airborne.

6. The method of claim 1 wherein the vehicle is space based.

7. The method of claim 1 wherein the target is at a fixed position.

8. The method of claim 1 wherein the target is moving.

9. The method of claim 1 including calculating an initial position of the target based on an initial position of the vehicle and an initial difference in altitude between the vehicle and the target.

10. The method of claim 1 including calculating the current position of the target based on the current position of the vehicle and altitude of the target.

11. The method of claim 1 including calculating the current position of the target based on the current position of the vehicle and difference in altitude between the current position of the vehicle and current position of the target.

12. The method of claim 1 wherein the attitude includes pitch, roll, and heading.

13. The method of claim 1 wherein a gyroscope is used to maintain the line of sight of the camera.

14. The method of claim 1 wherein combining the determined dynamic and static adjustments allows for smooth and continuous adjustments to be made based on velocity while correcting for accumulated errors in the line of sight.

15. A calibration system for controlling the orientation of a device to remain fixed on a target, the device being on a vehicle that is moving relative to a target, comprising:
   a component that sets an initial line of sight for the camera that is aimed at the current position of the target;
   a component that calculates a transformation matrix $C_{CE}$ for transforming from the earth reference frame to the camera reference frame;
   a component that periodically determines a static adjustment by, calculating a position vector $\Delta R^E$ between the vehicle and the target in the earth reference frame as: $\Delta R^E = R_{target}^E - R_{aircraft}^E$, wherein $R_{target}^E$ represents the current position of the target and $R_{aircraft}^E$ represents the current position of the vehicle, calculating a position vector $\Delta R^C$ between the vehicle and the target in the camera reference frame by transforming the position vector $\Delta R^E$ to the camera reference frame as $\Delta R^C = C_{CE} \Delta R^E$, calculating a normalized position vector $\Delta \tilde{R}^C$ as $$\Delta \tilde{R}^C = \frac{\Delta R^C}{|\Delta R^C|},$$

wherein the normalized position vector indicates the difference between the actual line of sight of the camera and the line of sight needed to point to the target in the scan and tilt directions, and setting the line of sight of the camera based at least in part on the normalized position vector $\Delta \tilde{R}^C$;

a component that periodically determines a dynamic adjustment by, calculating a velocity vector $\Delta V^E$ between the vehicle and the target in the earth reference frame as: $\Delta V^E = V_{target}^E - V_{aircraft}^E$, wherein $V_{target}^E$ represents the current velocity of the target and $V_{aircraft}^E$ represents the current velocity of the vehicle, calculating a velocity vector $\Delta V^C$ between the vehicle and the target in the camera reference frame by transforming the velocity vector $\Delta V^E$ to the camera reference frame as $\Delta V^C = C_{CE} \Delta V^E$, calculating a normalized velocity vector $\Delta \tilde{V}^C$ as $$\Delta \tilde{V}^C = \frac{\Delta V^C}{|\Delta R^C|},$$

wherein the normalized velocity vector indicates the angular velocity that the camera needs to move in the scan and tilt directions to compensate for overflight velocity, and setting an angular velocity for moving the line of sight of the camera based at least in part on the normalized velocity vector $\Delta \tilde{V}^C$; and a component that maintains the line of sight of the camera by combining the determined dynamic and static adjustments as the attitude of the vehicle changes relative to the current position of the target, including setting an adjustment A for the camera wherein $A = \Delta \tilde{R}^C * W + \Delta \tilde{V}^C$ and wherein W represents a weighting factor based at least in part on the accuracy of the measurements used to calculate the dynamic and static adjustments.

16. The system of claim 15 wherein the initial line of sight of the camera is set based on an operator centering the line of sight of the camera on the target.

17. The system of claim 15 wherein the initial line of sight of the camera is set based on the current position of the target and the current position and attitude of the vehicle.

18. The system of claim 15 wherein the vehicle is land based.

19. The system of claim 15 wherein the vehicle is airborne.

20. The system of claim 15 wherein the vehicle is space based.

21. The system of claim 15 wherein the target is at a fixed position.

22. The system of claim 15 wherein the target is moving.

23. The system of claim 15 including calculating an initial position of the target based on an initial position of the vehicle and an initial difference in altitude between the vehicle and the target.

24. The system of claim 15 including calculating the current position of the target based on the current position of the vehicle and altitude of the target.

25. The system of claim 15 including calculating the current position of the target based on the current position of the vehicle and difference in altitude between the current position of the vehicle and current position of the target.

26. The system of claim 15 wherein the attitude includes pitch, roll, and heading.

27. The system of claim 15 wherein a gyroscope is used to maintain the line of sight of the camera.

28. The system of claim 15 wherein combining the determined dynamic and static adjustments allows for smooth and continuous adjustments to be made based on velocity while correcting for accumulated errors in the line of sight.

* * * * *